United States Patent [19]

Yoshimura et al.

[11] Patent Number: 4,600,636
[45] Date of Patent: Jul. 15, 1986

[54] CORE MATERIAL FOR AN AUTOMOBILE BUMPER

[75] Inventors: Shohei Yoshimura, Tomioka; Akira Adachi, Sakura, both of Japan

[73] Assignee: Japan Styrene Paper Corporation, Tokyo, Japan

[21] Appl. No.: 708,937

[22] Filed: Mar. 6, 1985

[30] Foreign Application Priority Data

Mar. 8, 1984 [JP] Japan .................. 59-44541

[51] Int. Cl.$^4$ ............................ B32B 3/18; B32B 5/18
[52] U.S. Cl. .................... 428/304.4; 428/71; 428/76; 521/58; 521/144
[58] Field of Search ............... 428/317.9, 403, 407, 428/71, 76, 313.5, 304.4; 521/58, 60, 144

[56] References Cited

U.S. PATENT DOCUMENTS 4,443,393 4/1984 Akiyama et al. .................. 521/58
4,504,534 3/1985 Adachi et al. .................... 521/58
4,504,601 3/1985 Kuwabara et al. ................ 521/144

Primary Examiner—William J. Van Balen
Attorney, Agent, or Firm—Sherman & Shalloway

[57] ABSTRACT

For use in an automobile bumper, a core material composed of a molded article of prefoamed polyolefin resin particles. The core material has a density of 0.05 to 0.15 g/cm$^3$ and the relation represented by the following expression $$E_{20}/\rho \geq 20 \text{ kg-cm/g}$$

wherein $E_{20}$ is the amount of energy absorption (kg-cm/cm$^3$) when the core material is compressed to 50% at 20° C., and $\rho$ is the density (g/cm$^3$) of the core material.

8 Claims, 4 Drawing Figures

CORE MATERIAL FOR AN AUTOMOBILE BUMPER

This invention relates to a core material for use in an automobile bumper.

Conventional automobile bumpers are made of a metallic material, but as modern automobiles have been required to be light in weight for energy saving, plastic foams such as a polyurethane foam have been suggested as substitutes for the metallic material. Such bumpers are usually composed of a core material of a plastic foam and a surface material of a synthetic resin encasing the foam core material. Polyurethane foams and polystyrene foams are two typical examples proposed as the plastic foam core material.

The bumper core material made of a foam is an important member which affects the performance of the automobile bumper. Generally, the core material is required to have excellent energy absorbing property and shock resistance. Furthermore, in view of the recent requirement for lighter automobile weight, the core material has also been required to be lighter.

The polyurethane foam as a conventional core material for an automobile bumper has the defect that because of its lower energy absorption per unit weight, it cannot be sufficiently made light in weight, and its cost is also high. The polystyrene foam, on the other hand, has the defect of being inferior in oil resistance and shock resistance. Thus, the conventional core materials for automobile bumpers have their advantages and disadvantages, and cannot fully meet the requirements for bumper cores.

As an attempt to remove the defects of the conventional bumper cores, Japanese Laid-Open Patent Publication No. 221,745/1983 discloses a bumper core material composed of a molded article of foamed polypropylene resin particles having a density of 0.015 to 0.045 g/cm$^3$ and a compressive stress at 50% compression of at least 1 kg/cm$^2$. This core material can give a lightweight automobile bumper having excellent energy absorbing property. Nowadays, bumpers are required to be rendered lighter in weight and smaller in size for a larger passenger occupying space within the range of a fixed automobile length; in other words, the bumper height l (the width of the bumper in its front-rear direction) as shown in FIG. 4 should be decreased. But in the case of a bumper core material composed of the molded article of foamed polypropylene resin particles, there is a limit to the extent to which the bumper height l can be decreased without reducing the shock resistance required of the bumper, and this core material still leaves room for improvement.

The present invention has been accomplished in view of the above state of the art, and has for its object the provision of a core material for automobile bumpers which can lead to size and weight reduction without reducing shock resistance.

According to this invention, there is provided a core material for use in automobile bumpers, said core material being composed of a molded article of prefoamed particles of a polyolefin resin, and having a density of from 0.05 to 0.15 g/cm$^3$ and the relation represented by the following expression $$E_{20}/\rho \geq 20 \text{ kg-cm/g}$$

wherein $E_{20}$ is the amount of energy absorption (kg-cm/cm$^3$) when the core material is compressed to 50% at 20° C., and $\rho$ is the density (g/cm$^3$) of the core material.

The present invention will be described in detail partly with reference to the accompanying drawings in which.

The core material of this invention can be made from a molded article obtained, for example, by filling prefoamed particles of a polyolefin resin in a mold of the desired shape, and heating and expanding them with steam or the like. Examples of the polyolefin resin include polyethylene, polypropylene, ethylene/propylene copolymer, ethylene/vinyl acetate copolymer and a mixture of ethylene/propylene copolymer with low-density polyethylene and/or ethylene/vinyl acetate copolymer. Of these, polypropylene, ethylene/propylene random copolymer and high-density polyethylene are preferred. In the case of copolymers of an olefin with another monomer, the proportion of the olefin is preferably at least 95% by weight. These polyolefin resins may be crosslinked or non-crosslinked, but crosslinked resins are especially preferred.

The prefoamed particles of the polyolefin resin can be obtained, for example, by dispersing particles of the polyolefin resin and a blowing agent in a dispersion medium such as water in a closed vessel, heating the resin particles to a temperature above a point at which they are softened, thereby to impregnate the resin particles with the blowing agent, then opening one end of the vessel, and releasing the resin particles and the dispersion medium into an atmosphere kept at a pressure lower than the pressure of the inside of the vessel to expand the resin particles.

The core material of the invention has a density $\rho$ of 0.05 to 0.15 g/cm$^3$, preferably 0.06 to 0.13 g/cm$^3$, and also has the relation represented by the following expression $$E_{20}/\rho \geq 20 \text{ kg-cm/g}$$

preferably $$E_{20}/\rho \geq 22 \text{ kg-cm/g}$$

wherein $E_{20}$ is the amount of energy absorption (kg-cm/cm$^3$) when the core material is compressed to 50% at 20° C., and $\rho$ is the density (g/cm$^3$) of the core material.

When the core material has a density of less than 0.05 g/cm$^3$, a bumper having a decreased bumper height l cannot be produced without reducing its shock resistance even if it has the relation $E_{20}/\rho \geq 20$ kg-cm/g. On the other hand, the core material having a density of more than 0.15 g/cm$^3$, has a large weight even if it has the relation $E_{20}/\rho \geq 20$ kg-cm/g. Consequently, a bumper of a lighter weight cannot be produced. If the $E_{20}/\rho$ is less than 20 kg-cm/g, even a core material having a density of 0.05 to 0.15 g/cm³ is required to be increased in thickness in order to secure sufficient shock resistance. As a result, the weight of the core material increases, and a bumper of a smaller size and a lighter weight cannot be produced.

Figure 1:
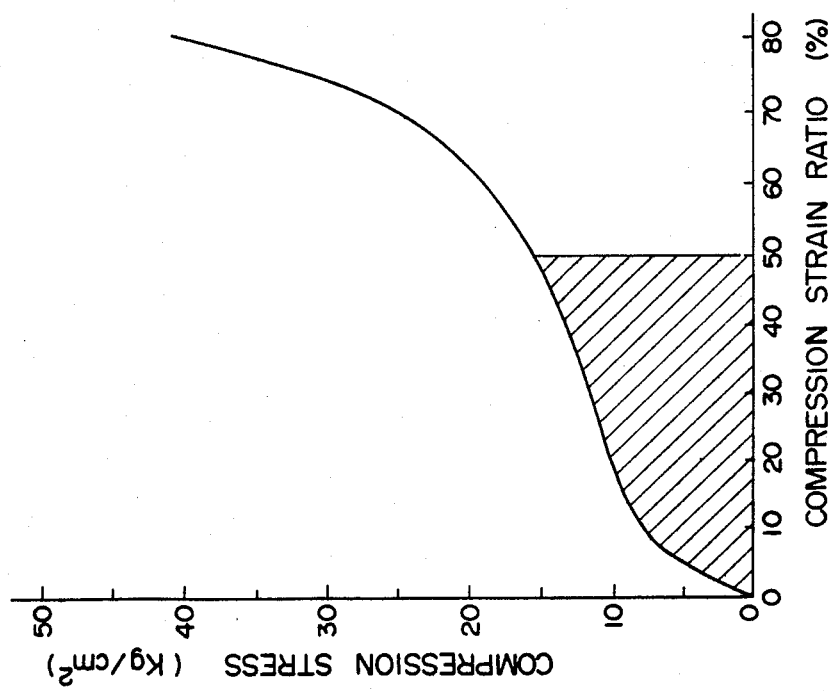
FIG. 1 is a graph showing the amount of energy absorption of the core material at 50% compression in a compressive strain-compressive stress curve.
Figure 4:
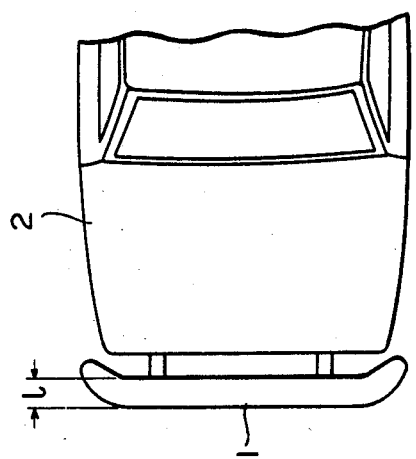
FIG. 4 is a rough top plan view of the essential parts of an automobile including a bumper 1 and a body 2.

As shown in FIG. 1, the amount of energy absorption, $E_{20}$ (kg-cm/cm³), of the core material at 20° C. and 50% compression can be determined as the area of the hatched portion in FIG. 1 ranging from a compressive strain of 0 to 50% in the compressive strain-compressive stress curve of the core material at 20° C.

In order for the core material to have the relation $E_{20}/\rho \geq 20$ kg-cm/g, the prefoamed particles of the polyolefin resin used for the production of the core material are preferably those which are nearly spherical in shape, have a particle diameter of 2 to 15 mm, a cell diameter of 0.10 to 2.00 mm and a proportion of closed cells of at least 90% and contain air filled within the cells.

The core material of this invention can be produced, for example, by subjecting the prefoamed particles of the polyolefin resin to a pressurizing treatment with an inorganic gas such as air, oxygen, nitrogen or carbon dioxide or a mixture of the inorganic gas with a volatile organic blowing agent such as hexane, heptane, dichlorodifluoromethane and trichlorotrifluoroethane to impart an internal pressure of about 0.8 to 4.5 kg/cm²-G to the prefoamed particles, thereafter filling the prefoamed particles in a mold of a desired shape for producing a bumper core material, and heating the prefoamed particles with steam under a pressure of about 2.5 to 4.5 kg/cm²-G to expand the particles and fuse the particles to one another.

By using the core material of this invention, there can be produced a bumper which has a bumper height of 50 to 100 mm and yet shows good shock resistance.

The following examples illustrate the present invention more specifically.

EXAMPLES AND COMPARATIVE EXAMPLES

In each run, the prefoamed particles indicated in Table 1 were pressurized with air to impart an internal pressure (the pressurizing treatment was not carried out in Comparative Example 3), and then filled in a mold for production of a bumper core material. The particles were then heated with steam to expand them and obtain a core material conforming to the shape of the mold. Table 2 shows the density, the amount of energy absorption $E_{20}$ at 50% compression and 20° C., and the $E_{20}/\rho$ value of the core material. Comparative Example 1 is outside the scope of the invention in regard to density; Comparative Example 2, in regard to density and $E_{20}/\rho$; and Comparative Example 3, in regard to the type of the base resin.

Table 2 also shows the various properties of the core material.

The shock resistance was tested at 40° C. by using, as samples, molded articles having a thickness of 60 mm (both 60 mm and 100 mm in the Comparative Examples) and an area of 40 mm × 40 mm prepared under the same molding conditions at the same expansion ratio (same density) by using the prefoamed particles indicated in Table 1.

As referential examples, Table 2 also shows the properties of commercial bumper core materials made of a polyurethane foam.

Figure 2:
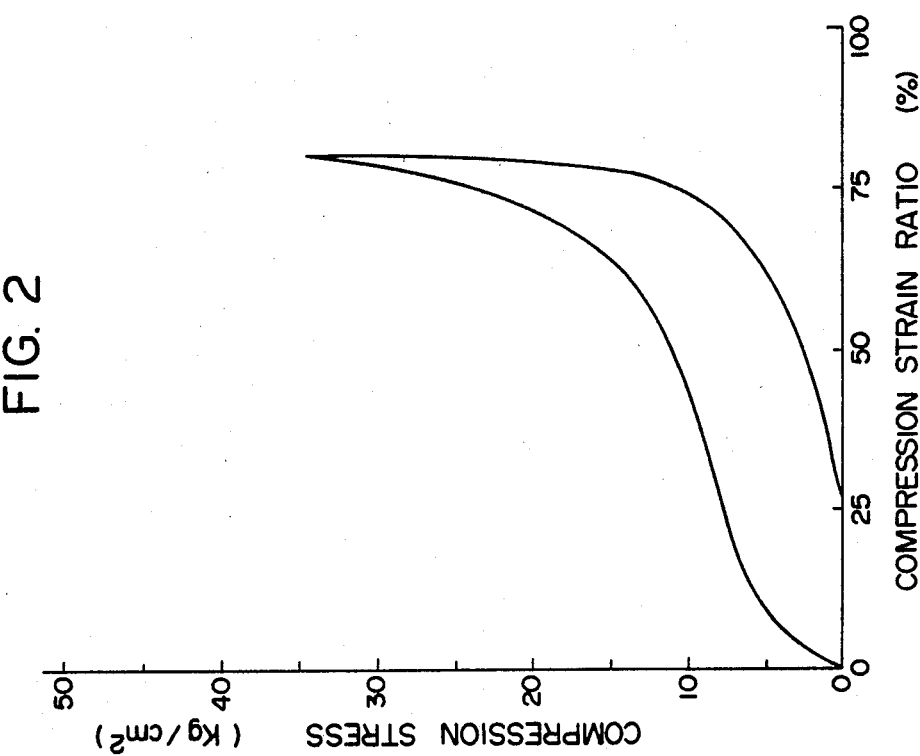
FIG. 2 is a strain-stress curve of a 60 mm-thick test sample obtained in accordance with Example 4 in a shock resistance test.
Figure 3:
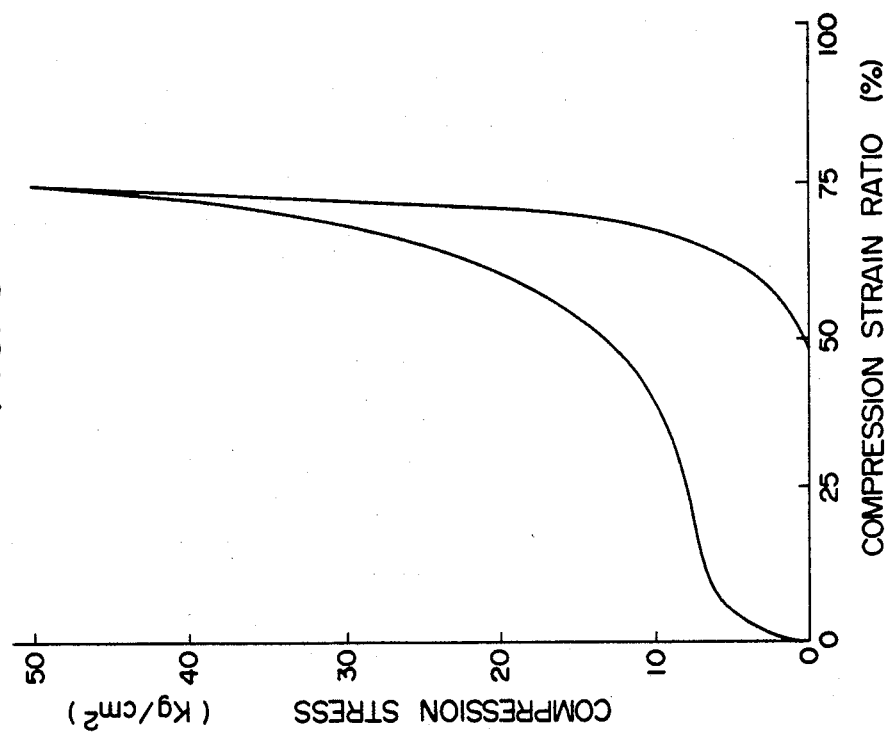
FIG. 3 is a strain-stress curve of a 60 mm-thick test sample obtained in accordance with Referential Example 2 in a shock resistance test.

The strain-stress curves of the 60 mm-thick samples in the shock resistance tests in Example 4 and Referential Example 2 are shown in FIGS. 2 and 3, respectively.

TABLE 1

| | Base resin | | | Properties of the prefoamed particles | | |
|---|---|---|---|---|---|---|
| | Type | Gel fraction (%) | Density (g/cm³) | Average particle diameter (mm) | Average cell diameter (mm) | Apparent density (g/cm³) |
| Example | | | | | | |
| 1 | Ethylene/propylene random copolymer (ethylene content 3.2 wt. %) | 38 | 0.908 | 4.5 | 0.45 | 0.06 |
| 2 | Ethylene/propylene random copolymer (ethylene content 3.2 wt. %) | " | " | " | " | 0.09 |
| 3 | Ethylene/propylene random copolymer (ethylene content 3.2 wt. %) | Non-crosslinked | 0.910 | 5.2 | 0.65 | 0.06 |
| 4 | Ethylene/propylene random copolymer (ethylene content 3.2 wt. %) | Non-crosslinked | " | " | " | 0.09 |
| 5 | High-density polyethylene | 35 | 0.968 | 5.8 | 0.54 | 0.06 |
| 6 | " | " | " | " | " | 0.10 |
| Comparative Example | | | | | | |
| 1 | Ethylene/propylene random copolymer (ethylene content 3.2 wt. %) | Non-crosslinked | 0.910 | 4.5 | 0.83 | 0.03 |
| 2 | Low-density polyethylene | 62 | 0.923 | 6.0 | 0.74 | 0.20 |
| 3 | Polystyrene | — | 1.05 | 4.5 | 0.21 | 0.06 |

TABLE 2

| | $\rho$ (g/cm³) | $E_{20}$ (kg-cm/cm³) | $E_{20}/\rho$ (kg-cm/g) | Heat resistance (*1) | Oil resistance (*2) | Shock resistance(*3) | | Overall evaluation (*5) |
|---|---|---|---|---|---|---|---|---|
| | | | | | | 60 mm-thick sample | 10 mm-thick sample | |
| Example | | | | | | | | |
| 1 | 0.06 | 1.8 | 30.0 | O | O | O | — | O |
| 2 | 0.09 | 2.9 | 32.2 | O | O | O | — | O |
| 3 | 0.06 | 1.7 | 28.3 | O | O | O | — | O |
| 4 | 0.09 | 2.7 | 30.0 | O | O | O | — | O |

TABLE 2-continued

| | $\rho$ (g/cm³) | $E_{20}$ (kg-cm/cm³) | $E_{20}/\rho$ (kg-cm/g) | Heat resistance (*1) | Oil resistance (*2) | Shock resistance(*3) | | Overall evaluation (*5) |
|---|---|---|---|---|---|---|---|---|
| | | | | | | 60 mm-thick sample | 10 mm-thick sample | |
| 5 | 0.06 | 1.4 | 23.3 | O | O | O | — | O |
| 6 | 0.10 | 2.5 | 25.0 | O | O | O | — | O |
| Comparative Example | | | | | | | | |
| 1 | 0.03 | 0.9 | 30.0 | O | O | X | O | X |
| 2 | 0.20 | 3.1 | 15.5 | X | O | O | O | X |
| 3 | 0.06 | 2.5 | 41.7 | X | X | X | X | X |
| Referencial Example | | | | | | | | |
| 1 | 0.09 | 1.1 | 12.2 | O | O | X(*4) | X(*4) | X |
| 2 | 0.22 | 3.0 | 13.6 | O | O | X(*4) | O(*4) | X |

The various properties shown in Table 2 were measured and determined by the following methods.

(*1): Heat resistancee
The core material was heated at 100° C. for 24 hours, and its shrinkage (dimensional change) at this time was measured. The result was evaluated on the following scale.
 : the shrinkage was less than 5%
X: the shrinkage was at least 5%

(*2): Oil resistance
Kerosene at 20° C. was dropped onto the core material, and the core material was observed 2 hours later. The result was evaluated on the following scale.
 : the core material was not damaged by kerosene
X: the core material was damaged by kerosene (*3): Shock resistance
A load of 12 kg was let fall from a height of 60 cm onto the core material sample (60 mm or 100 mm thick) at 40° C. to impart shock and produce strain. Immediately then, the percent residual strain was measured, and evaluated on the following scale.
 : the percent residual strain was not more than 35%
X: the percent residual strain was more than 35%

(*4): Shock resistance (for Referential Examples)
Samples having the same sizes as in Comparative Examples were prepared by cutting commercial urethane bumper core materials, and tested in accordance with (*3) above.

(*5): Overall evaluation
 : excellent in regard to all of the above properties
X: inferior in regard to at least one of the above properties Since the core material of this invention is composed of a molded article of prefoamed particles of the polyolefin resin and has a density of 0.05 to 0.15 g/cm³ and the relation $E_{20}/\rho \geq 20$ kg-cm/g, it has a high energy absorptivity per unit weight and sufficient energy absorbing property. Moreover, even when its thickness is decreased, its shock resistance is not reduced. The height of a bumper made by using this core material can be decreased as compared with conventional bumpers having plastic cores, and the passenger occupying space in an automobile of a fixed length can be increased. Furthermore, since the bumper height can be decreased, the volume of the bumper can also be decreased. Consequently, the total weight of the bumper can be reduced.

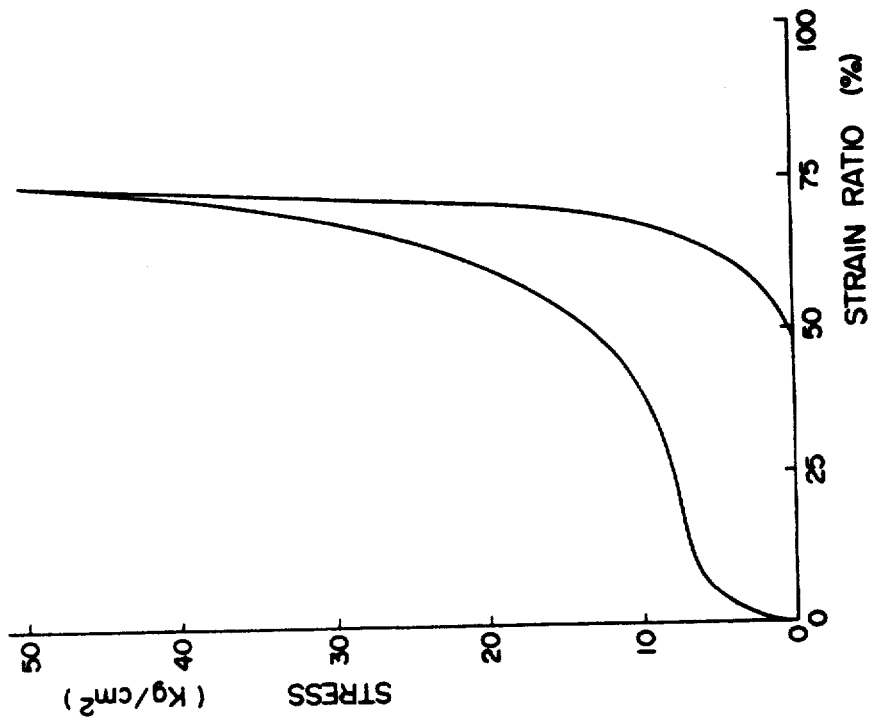

What is claimed is:

1. A core material for use in automobile bumpers, said core material being composed of a molded article of prefoamed particles of a polyolefin resin, and having a density of 0.05 to 0.15 g/cm³ and the relation represented by the following expression $$E_{20}/\rho \geq 20 \text{ kg-cm/g}$$

wherein $E_{20}$ is the amount of energy absorption (kg-cm/cm³) when the core material is compressed to 50% at 20° C., and $\rho$ is the density (g/cm³) of the core material,
wherein said particles are nearly spherical in shape, have a particle diameter of 2 to 15 mm, a cell diameter of 0.10 to 2.00 mm and a proportion of closed cells of at least 90% and contain air filled within the cells.

2. The core material of claim 1 which has a density of 0.06 to 0.13 g/cm³ and the relation represented by the following expression $E_{20}/\rho \geq 22$ kg-cm/g.

3. In an automobile bumper which is composed of a core material and a surface covering material, the improvement wherein said core material is composed of a molded article of prefoamed particles of a polyolefin resin, and having a density of 0.05 to 0.15 g/cm³ and the relation represented by the following expression $$E_{20}/\rho \geq 20 \text{ kg-cm/g}$$

wherein $E_{20}$ is the amount of energy absorption (kg-cm/cm³) when the core material is compressed to 50% at 20° C., and $\rho$ is the density (g/cm³) of the core material,
wherein said particles are nearly spherical in shape, have a particle diameter of 2 to 15 mm, a cell diameter of 0.10 to 2.00 mm and a proportion of closed cells of at least 90% and contain air filled within the cells.

4. The automobile bumper of claim 3 wherein the core material has a density of 0.06 to 0.13 g/cm³ and relation represented by the following expression $$E_{20}/\rho \geq 22 \text{ kg-cm/g}.$$

5. The automobile bumper of claim 3 which has a bumper height of from 50 to 100 millimeters.

6. The automobile bumper of claim 3 wherein the polyolefin resin is selected from the group consisting of polypropylene, ethylene/propylene random copolymer and high-density polyethylene.

7. The automobile bumper of claim 3 wherein the polyolefin resin is an ethylene/propylene random copolymer.

8. The automobile bumper of claim 3 wherein the polyolefin resin is high-density polyethylene.

* * * * *

UNITED STATES PATENT AND TRADEMARK OFFICE
CERTIFICATE OF CORRECTION

PATENT NO. : 4,600,636

DATED : July 15, 1986

INVENTOR(S) : Shohei Yoshimura et al.

It is certified that error appears in the above-identified patent and that said Letters Patent is hereby corrected as shown below:

FIGURES 1, 2 and 3, should appear as shown on the attached sheets.

Signed and Sealed this

Fourteenth Day of October, 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,600,636
DATED : July 15, 1986
INVENTOR(S) : Yoshimura, et al.

It is certified that error appears in the above-identified patent and that said Letters Patent is hereby corrected as shown below:

Please correct Fig. 1 as follows:

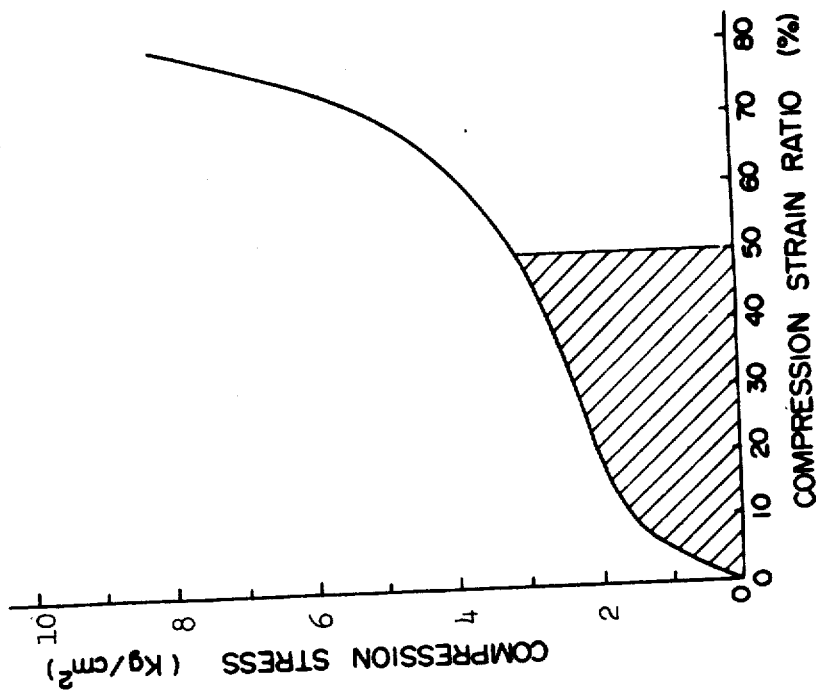

UNITED STATES PATENT AND TRADEMARK OFFICE
CERTIFICATE OF CORRECTION

PATENT NO. : 4,600,636
DATED : July 15, 1986
INVENTOR(S) : Yoshimura, et al.

It is certified that error appears in the above-identified patent and that said Letters Patent is hereby corrected as shown below: Correct Fig. 2 as follows

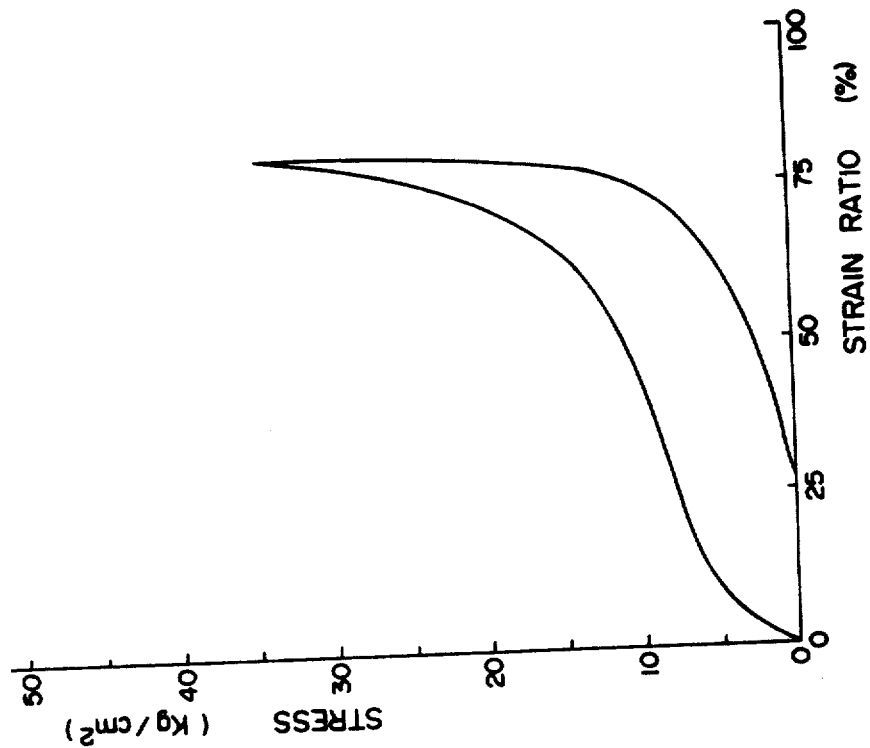

UNITED STATES PATENT AND TRADEMARK OFFICE
CERTIFICATE OF CORRECTION

PATENT NO. : 4,600,636

DATED : July 15, 1986

INVENTOR(S) : Yoshimura, et al.

It is certified that error appears in the above-identified patent and that said Letters Patent is hereby corrected as shown below: Correct Fig. 3 as follows: